(No Model.)
E. O. BLACKFORD.
ROLLER TREE SADDLE.
No. 438,052. Patented Oct. 7, 1890.
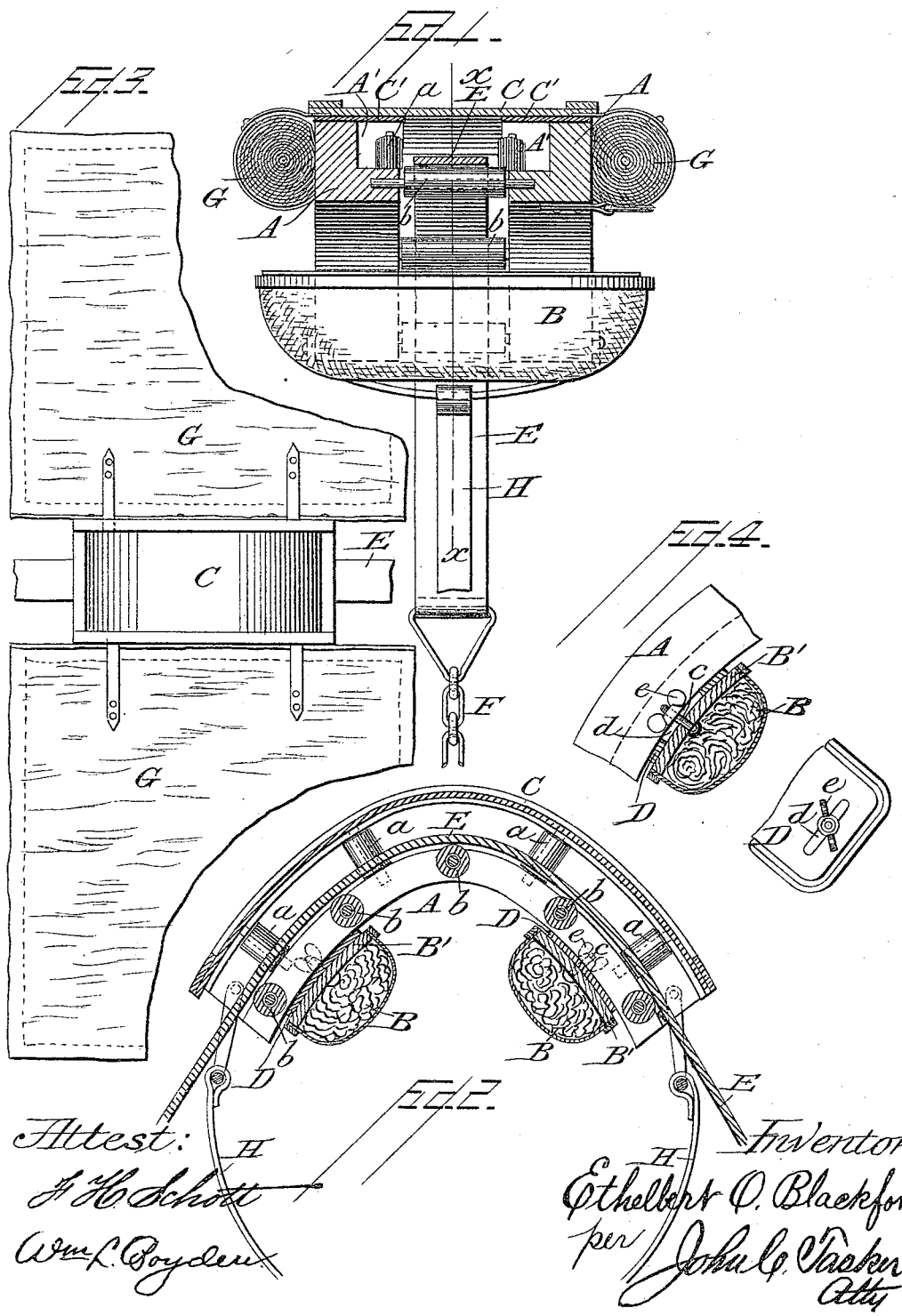

UNITED STATES PATENT OFFICE.

ETHELBERT O. BLACKFORD, OF SHELBY, ALABAMA, ASSIGNOR OF ONE-HALF TO HOMER R. STOUGHTON, OF SAME PLACE.

ROLLER-TREE SADDLE.

SPECIFICATION forming part of Letters Patent No. 438,052, dated October 7, 1890.

Application filed April 16, 1890. Serial No. 348,213. (No model.)

*To all whom it may concern:*

Be it known that I, ETHELBERT O. BLACKFORD, a citizen of the United States, residing at Shelby, in the county of Shelby and State of Alabama, have invented certain new and useful Improvements in Cart-Saddles; and I do hereby declare the following to be a full, clear, and exact description of the invention, such as will enable others skilled in the art to which it appertains to make and use the same.

This invention relates to an improvement in cart-saddles, the tree or trees of which are provided with rollers, the object of the invention being to provide a simple, cheap, efficient, and useful saddle for preventing of sore backs, for use upon mules or other animals having sore or injured backs, the saddle being constructed with adjustable pads and having also a self-adjusting back strap which is connected to the cart-shafts, so that the saddle is prevented from rubbing or galling the tender parts of the sore back of the animal, thus permitting it to gradually heal without the necessity of the animal abstaining from work; and the invention consists, essentially, in the construction, arrangement, and combination of the several parts, substantially as will be hereinafter described, and then more particularly pointed out in the appended claims.

In the accompanying drawings, illustrating my invention, Figure 1 is a transverse sectional view, in partial elevation, of my improved roller-tree saddle. Fig. 2 is a vertical longitudinal section of the same on the line $xx$ of Fig. 1. Fig. 3 is a top plan view showing the front and rear covers with which the saddle is provided and which are adapted to cover the back of the animal in front and rear and protect him from the cold or stormy weather. Fig. 4 shows the mode of adjustably connecting the saddle-pads to the saddle, and represents one of the pads in section with its adjustable device in elevation, and also represents in another view the adjustable device in plan.

Like letters of reference designate corresponding parts throughout the different figures of the drawings.

In carrying my invention into practical effect I first provide two or more saddle-trees A A of the usual form, said trees having, preferably, their inner opposing faces rabbeted at A' A'. These strips are secured together by means of the strips or plates D D, that are firmly secured to the under side of the tree directly opposite the pads and between them and the tree. Upon the trees is placed the saddle-cover C. I also preferably locate on the top of each tree, between the tree and the said cover C, a metallic or other strip C', curved correspondingly to the curvature of the tree and projecting from the aforesaid rabbets A' A'. It will be obvious from this description that the inner opposing faces of the trees are, by means of the rabbets and the plates C' C', provided, as it were, with grooves adapted for the reception of certain portions of the saddle—as, for instance, the vertical rollers—which I shall proceed to describe hereinafter. I do not desire to be restricted, however, to the particular construction of the trees which I have shown and described, but reserve the liberty of grooving the opposing faces of these trees in any manner that may be found best and suitable for the reception of the rollers.

$a\,a$ designate vertical rollers located within the groove or side recesses in the saddle-trees A A. These vertical rollers have their spindles suitably supported. Thus the lower ends of the said spindles are preferably supported by the lower portion of the trees, while their upper ends are held by the plates C' C', thus permitting the rollers $a\,a$ to freely revolve upon the spindles. The surfaces of these rollers are located close to the inner faces of the trees and in line therewith, as shown.

In addition to the series of vertical rollers, of which rollers there may obviously be any number, either four, as shown in the drawings, or more, or any number, I also provide the saddle with a curved series of horizontal rollers $b\,b$, whose spindles or shafts are integral therewith or rigidly secured at each end in the trees A A, (see Fig. 1,) so that the rollers may revolve freely upon the said spindles. Of these rollers there may also be any number. I have shown a convenient number (five) in the drawings; but there may obviously be any number of them, as may be deemed best.

E denotes the back strap, which usually passes over the saddle and is connected at each end to the shafts of the cart. This back-strap passes above the series of horizontal rollers between said rollers and the saddle-cover C and likewise between the vertical rollers *a a*. The back strap may be constructed in any convenient manner. It is preferably made of alternate sections, certain of which are of leather and the remainder of chain portions. In Fig. 1 I have shown this sectional construction of the strap F, representing one of the chain-sections.

B B indicate the pads, located at the points where saddle-pads are usually situated. These pads have the back plates B' B', which are situated in direct contact with the plates D D, which, as seen, are secured to the trees A A. Said plates D D are provided with slots *d d* near each end. The back plates B' B' carry near each end screw-threaded bolts *c c*, which pass through the slots *d d*. Said bolts are provided with thumb-screws *e e*. By means, therefore, of these bolts and thumb-screws, said bolts being located in the slots, as I have described, and carried by the pads, as seen, the said pads may be laterally adjusted in any suitable manner, and may be firmly secured at any desired point of adjustment by means of the screw devices. Any other suitable means may be employed for the purpose of adjusting the pads. The thumb-screw arrangement shown and described is only one example of many means that may be employed for the purpose.

In order to protect the animal from cold stormy weather, or other injurious influences, I find it convenient to provide the saddle with a rear cover and a front cover, adapted to be folded close to the saddle or to be unfolded and spread over the back of the animal at front and rear. In Fig. 1 these storm-covers G G are shown as rolled tightly and closely and lashed to the saddle. In Fig. 3 these storm-covers are shown as extended in the position that they occupy when they are placed over the animal to protect him from the storm. They are found to be of great advantage in connection with my improved roller-tree saddle, for while the saddle permits the injured parts to be healed the covers enable the animal to work in the cold and storm without being exposed to the contraction of any additional trouble.

H indicates the girth, which is attached at each end to the saddle. It may be of metal, leather, or any material, and may be secured by means of buckles, springs, rings, staples, or any other devices. Furthermore, I may say that the mode of attaching the storm-covers may vary within wide limits. Thus buckles, strap-hinges, springs, screws, rivets, or any other similar devices may be employed for the purpose.

With a saddle constructed in accordance with the principles of the invention, as here stated, it will be found that the sore back of the animal will soon heal, although the animal can be kept at work all the time while the healing process is going on. The pads are readily adjustable, as seen, so that they may be fixed in any desired position relatively to each other and to the animal's back and to the sore places thereon; also, the jolting of the cart on uneven ground will not tend to gall or aggravate the soreness of the back, since the back strap, which is connected to the shafts of the cart, easily adjusts itself by means of the supporting-rollers. The whole combination, therefore, subserves the useful purposes required by a saddle of this kind. It sits easily and firmly upon the animal's back at all times, and in practical experience it has been found that some of the worst and severest cases of injured animals have been thoroughly and satisfactorily healed, the animal working all the time, as usual.

Having thus described my invention, what I claim as new, and desire to secure by Letters Patent, is—

1. In a cart-saddle, the combination of the roller-trees, the back strap, the series of horizontal rollers supporting the same and the two series of vertical rollers adjacent to each edge of the strap, and the pads adjustable upon the trees.

2. In a cart-saddle, the combination of the roller-trees having their inner opposing faces rabbeted, the series of vertical rollers located in said rabbets, the horizontal rollers whose spindles are carried by the said trees, the back strap mounted on the said rollers between the vertical rollers, the slotted plates secured to the said trees, and pads connected to said plates so as to be adjustable upon the trees.

3. In a cart-saddle, the combination, with the two roller-trees A A and the saddle-cover, of the slotted connecting-plates D D, the pads B B, having back plates B' B' and suitable devices for adjustably connecting the pads and the plates D D, the series of horizontal rollers, the back strap upon the same, and the two series of vertical rollers adjacent to each edge of the said strap, substantially as described.

4. In a cart-saddle, the combination of the roller-trees A A, having rabbets A' A', the plates C' C', carried by the trees, the roller-cover C, the connecting-plates D D, slotted as specified, the pads B B, having their back plates B' B', bolts carried by said back plates and having thumb-screws, the back strap, and the horizontal and vertical rollers therefor, substantially as described.

In testimony whereof I affix my signature in presence of two witnesses.

ETHELBERT O. BLACKFORD.

Witnesses:
CHAS. A. BOWLES,
E. DUPHAM.